United States Patent
Fang et al.

(10) Patent No.: US 8,435,581 B2
(45) Date of Patent: May 7, 2013

(54) FOOD AND BEVERAGE EMULSIFIERS

(75) Inventors: Yuan Fang, Cortlandt Manor, NY (US); John Krulish, Bogota, NJ (US); Rod Jendrysik, Sycamore, IL (US)

(73) Assignee: PepsiCo, Inc., Purchase, NY (US)

( * ) Notice: Subject to any disclaimer, the term of this patent is extended or adjusted under 35 U.S.C. 154(b) by 1801 days.

(21) Appl. No.: 11/606,216

(22) Filed: Nov. 29, 2006

(65) Prior Publication Data

US 2008/0124437 A1  May 29, 2008

(51) Int. Cl.
*A23F 3/16* (2006.01)

(52) U.S. Cl.
USPC ........ 426/330.3; 426/557; 426/573; 426/580; 426/654

(58) Field of Classification Search ................... 426/557, 426/573, 654, 580, 330.3
See application file for complete search history.

(56) References Cited

U.S. PATENT DOCUMENTS

| | | | |
|---|---|---|---|
| 4,988,530 A * | 1/1991 | Hoersten et al. | 426/577 |
| 5,008,254 A * | 4/1991 | Weibel | 514/57 |
| 5,409,725 A | 4/1995 | Connolly | |
| 5,616,358 A | 4/1997 | Taylor et al. | |
| 5,976,603 A | 11/1999 | Kota et al. | |
| 6,890,578 B1 * | 5/2005 | Takahasi et al. | 426/577 |
| 2003/0021878 A1 | 1/2003 | Nunes et al. | |
| 2005/0266138 A1 * | 12/2005 | Yuan et al. | 426/573 |

FOREIGN PATENT DOCUMENTS

| | | |
|---|---|---|
| JP | 10-313781 A | 12/1998 |
| JP | 11-509421 A | 8/1999 |
| JP | 2004-329152 A | 11/2004 |
| JP | 2005-040024 A | 2/2005 |
| JP | 2005-185132 * | 7/2005 |
| JP | 2005-323530 A | 11/2005 |
| JP | 2006-274226 A | 10/2006 |
| WO | 03003849 | 1/2003 |
| WO | 03003860 | 1/2003 |
| WO | 03090558 | 11/2003 |
| WO | 2004017761 | 3/2004 |

OTHER PUBLICATIONS

International Search Report for PCT/US2007/085076 dated Aug. 26, 2008.
JP Notice of Grounds for Rejection dated Nov. 15, 2011 received in corresponding Application No. 2009-539414.

* cited by examiner

*Primary Examiner* — Rena Dye
*Assistant Examiner* — Lela S Williams
(74) *Attorney, Agent, or Firm* — Banner & Witcoff, Ltd.

(57) ABSTRACT

An emulsifier having a primary emulsifying component of gum Arabic or modified starch and a secondary emulsifying component of pectin in a low amount is added to a beverage. The emulsifier has similar physical characteristics as conventional emulsifiers, with increased emulsifying capacity. Emulsifiers, such as gum Arabic or modified starch, conventionally used in food products can be easily replaced with the emulsifier to lower the cost of production.

12 Claims, 1 Drawing Sheet

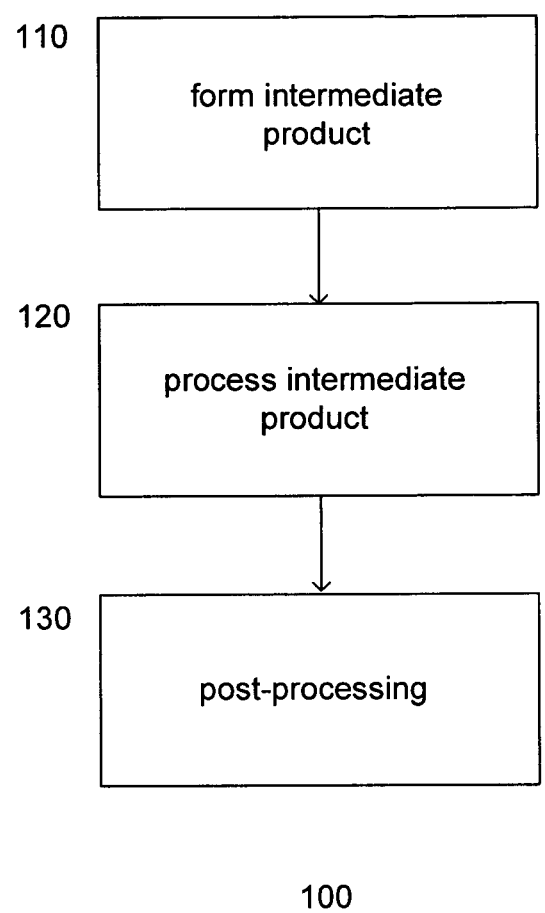

FOOD AND BEVERAGE EMULSIFIERS

FIELD OF THE INVENTION

The present invention relates generally to food products, and more specifically, to emulsifiers for food products.

BACKGROUND OF THE INVENTION

In food processing, a mixture of food components is typically subjected to a range of thermal and mechanical treatments, for example, baking, boiling, steaming, freezing, kneading, mixing and extruding, to form a food product with the desired taste, texture, as well as desired visual properties such as color and shape. Food components include carbohydrates, proteins, oils, fats, water as well as minerals, vitamins and flavors. Each food component has its own unique properties, and may be incompatible with other food components when present in a mixture. For example, oil and water are immiscible, and form a thermodynamically unstable emulsion when mixed together. The oil and water phases will gradually separate, causing the emulsion to coalesce, flocculate, cream or break. This can negatively impact the characteristics of the product, such as shelf-life, taste, or aesthetics.

To render food components compatible, emulsifiers are employed. Emulsifiers allow immiscible substances, such as oil and water, to mix homogenously and to produce stable emulsions. An important consideration in food production is that the emulsifier used should not impart an off-taste or other negative characteristics to the food product. In particular, beverage products tend to require special considerations when it comes to emulsifiers, both in terms of functionality and taste neutrality. As a result, choice of emulsifiers for use with beverages is limited. A commonly used emulsifier for beverages is gum Acacia (gum Arabic) prepared from an exudate from the stems and branches of the sub-Saharan species of the Acacia tree, Acacia senagal and Acacia seyal. However, due to its high demand and unreliable supply, gum Arabic can be difficult and expensive to obtain. Also, gum Arabic may fluctuates in its quality.

From the above discussion, it is desirable to provide an emulsifier with desirable characteristics, such as the ability to maintain a stable emulsion, good mouthfeel, texture and taste, and which can be obtained easily and cost effectively. It is also desirable to provide an emulsifier system that may increase the overall emulsifying capability so as to reduce the use of gum Arabic.

SUMMARY OF THE INVENTION

The present invention relates to emulsifiers which can be used to stabilize oil-in-water emulsions. The emulsifier is particularly useful for forming products which currently employ modified starch, gum Arabic or high molecular weight water soluble emulsifier systems as well as other types of conventional emulsifier systems. Various types of products, such as beverages, non-beverage food products, and non-food products, can be formed using the emulsifier. For example, the emulsifier can be used to stabilize flavor emulsion in beverages such as carbonated soft drinks. Other beverages can also be formed using the emulsifier.

According to one aspect of the invention, the emulsifier comprises a primary emulsifying component and a secondary emulsifying component. The primary emulsifying component can include conventional emulsifiers such as gum Arabic, modified starch, high molecular weight water soluble emulsifier or a combination thereof, while the secondary emulsifying component includes pectin. The ratio of the primary emulsifying component and the secondary emulsifying component is tailored to impart the emulsifier with characteristics of gum Arabic or modified starch, while producing at least a 2-folds increase in emulsifying capacity over such conventional emulsifiers.

According to another aspect of the invention, the emulsifier is used in a process for forming a product. The process comprises pre-processing to produce an intermediate product. The emulsifier is added to the intermediate product. The emulsifier includes a primary emulsifying component comprising a conventional emulsifier such as gum Arabic, modified starch, high molecular weight water soluble emulsifier or a combination thereof, and a secondary emulsifying component comprising pectin. The ratio of the primary emulsifying component and the secondary emulsifying component is tailored to impart the emulsifier with characteristics of gum Arabic or modified starch, while producing at least a 2-folds (i.e., 200%) increase in emulsifying capacity over such conventional emulsifiers. After the emulsifier is added, the intermediate product undergoes post-processing to form the product. The present invention enables a reduction in the use of emulsifiers as compared to products formed with conventional emulsifiers, thus lowering production cost. For example, the present invention enables a reduction of the use of primary emulsifying component such as gum Arabic.

These and other objects, along with advantages and features of the present invention herein disclosed, will become apparent through reference to the following description and the accompanying drawings. Furthermore, it is to be understood that the features of the various embodiments described herein are not mutually exclusive and can exist in various combinations and permutations.

BRIEF DESCRIPTION OF THE DRAWINGS

FIG. 1 shows a process for stabilizing food or beverages in accordance with one embodiment of the invention.

DETAILED DESCRIPTION OF THE INVENTION

The present invention relates to emulsifiers. In one embodiment, the emulsifier provides a stable oil-in-water emulsion with good shelf stability. The emulsifier can be used to process various types of food products. The emulsifier is particularly useful for forming products which currently employ modified starch, gum Arabic or high molecular weight water soluble emulsifier systems to function as an emulsifier to stabilize oil-in-water emulsions. The emulsifier can also be used to replace or partially replace other types of conventional emulsifying systems.

Generally, the emulsifier is employed in beverages, including flavored carbonated or non-carbonated soft drinks, dairy-based beverages, soy beverages, tea, fruit drinks, flavored juices, sports drinks (e.g., Gatorade®), alcoholic beverages, as well as other types of beverages. The beverage can also be provided in instant powder mix form. Other forms such as liquid concentrates, which needs to be reconstituted with other liquids such as milk, water and juices before consumption, are also useful. Forming other types of beverages, non-beverage food products, or non-food products is also contemplated and within the scope of the invention. Examples include products such as baked goods, syrups, flavor oil emulsions, salad dressings, mayonnaise, dairy products, ice creams, various types of pates, confectionary, jam, jellies, inks, adhesives, cosmetics, medications, or creams. Other products may also be useful.

The emulsifier according to the invention comprises pectin. Pectin is found in the cell walls of most plants, such as vegetable and fruit plants. Pectin is also found in the pulp and skins of fruits. Chemically, pectin is a polysaccharide containing about 300 to 1000 monosaccharide units, the principal monosaccharide unit being the D-galacturonic acid group. The length and complexity of the polysaccharide chain and the order of the monosaccharide units within the chain may vary depending on the source of the pectin. Typically, the molecular weight of pectin is about 50,000 to 150,000 Daltons. The D-galacturonic acid groups of the polysaccharide chain may be esterified with methyl groups. Pectins are categorized by the degree of esterification (DE) of the D-galacturonic acid groups. DE is defined as the number of esterified galacturonic acid groups expressed as a percentage (0-100%) of the total number of galacturonic acid groups present in the molecule. A high methoxyl (HM) pectin comprises DE of 50% or greater, whereas a low methoxyl (LM) pectin comprises DE of less than 50%.

The DE greatly influences the properties of pectin. For example, HM pectins generally form thermally irreversible gels in the presence of sufficient sugar content, such as sucrose, and at a pH below about 3.5, while LM pectins form thermally reversible gels in the presence of calcium ions at a pH of about 3-4.5. The lower the DE, the slower the rate of gel formations. Additionally, the molecular weight (MW) of pectin also affects its properties. High MW pectins generally tend to gel more easily and rapidly whereas low MW pectins, in contrast, tend to gel more slowly. The degree of branching of the D-galaturonic acid chains also affects the gelling property of pectin.

Because pectin is shown to stabilize oil-in-water emulsion, it is used an emulsifier. However, conventional use of pectin as an emulsifier is often used at high concentration (i.e., 1-2 wt %). Whether pectin can be used as an emulsifier at lower concentrations is not known.

Unless otherwise specified, % is used interchangeable with wt %, % wt or % wt/wt. % refers to weight percentage of a specified ingredient relative to the total weight of the composition.

In accordance with one embodiment of the invention, an emulsifier comprising a primary emulsifying component (PEC) and a secondary emulsifying component (SEC) is provided.

The PEC comprises a conventional modifier. The conventional modifier includes, for example, modified starch, gum Arabic or high molecular weight water soluble emulsifier, or a combination thereof. In one embodiment, the PEC comprises a modified starch. The modified starch can comprise an octenylsuccinate modified food starch. In another embodiment, the PEC comprises gum Arabic.

The PEC can include one or more additional PEC emulsifiers (APEC). Various types of emulsifiers can be added to the PEC. For example, the APEC can comprise hydrocolloids such as carageenan, agar, xanthan gum, gellan gum, guar gum, gum ghatti, locust bean, modified gums or the like or a combination thereof. The APEC can serve as a thickening agent, depending on the application. The amount of APEC added may depend on the desired viscosity of the food product. Typically, the amount of APEC added is about 0.05% of the formulation. Other amounts may also be useful.

The SEC can comprise various types of pectin. The SEC, in one embodiment, comprises HM pectin, and can be derived from various sources, such as apples, beets or a combination thereof. In one embodiment, the SEC comprises beet pectin. Beet pectin contains a higher proportion of side chains as compared with standard pectin. Beet pectin also has a higher protein content, of about 10%, than that in standard pectin, of about 2 or 3%. The increased side chains and protein content provide for improved emulsifying properties of beet pectin as compared with standard pectin. Additionally, beet pectin does not contribute to an undesirable thickening of the beverage, thereby imparting good texture or mouthfeel to the beverage.

The combination of pectin and modified starch provides similar physical characteristics and attributes as that of gum Arabic. Alternatively, the combination of pectin and gum Arabic provides similar physical characteristics and attributes of modified starch. The compositional ratio of PEC to SEC (PEC:SEC) is in the range of 100 to 1 or 50 to 1 which contributes to at least a 2-folds increase in emulsifying capacity over conventional PEC alone. In one embodiment, the emulsifier has an emulsifying capacity which is greater than conventional emulsifiers by at least 3-folds, and preferably by at least 10-folds. The ratio of PEC:SEC, in one embodiment, is about 100:1. Preferably, the ratio of PEC:SEC is about 50:1.

The emulsifier can be provided in various forms. For example, the emulsifier can be provided in dry form. An effective amount of emulsifier is added to a product mixture to form a stable emulsion. The effective amount depends on the amount of fat or oil that needs to be stably dispersed in the emulsion. The effective amount may also depend on the type of emulsion used. Generally, the effective amount added is about 2-3 times less than that needed when conventional emulsifiers are used. For example, 5 weight percent [wt %] instead of 15 wt % of emulsifier can be provided to emulsify 10 wt % of oil.

As described, the emulsifier according to the invention enables products to be produced using a lower quantity of emulsifier as compared to when conventional emulsifiers, such as gum Arabic and modified starch, are used. This advantageously reduces manufacturing costs. Furthermore, since the present emulsifier can be tailored to closely match the characteristics and attributes of conventional emulsifiers, substituting products with the emulsifier of the invention can be easily achieved.

FIG. 1 shows a process 100 for forming a food product in accordance with one embodiment of the invention. At step 110, pre-processing steps are performed to provide a first intermediate product. Pre-processing includes, for example, providing initial ingredients that are processed to form the first intermediate product. In one embodiment, the first intermediate product comprises a beverage concentrate. The pre-processing steps can be conducted at any stage of the process in which the emulsifier can be added to the intermediate product. For example, the pre-processing can be conducted at an initial stage where ingredients are mixed or during subsequent stages, depending on the product or application. Some types of products or processing schemes may offer choices of different processing stages in which the emulsifier is added. Furthermore, the pre-processing may include processing stages being performed in parallel to form numerous intermediate products which will subsequently be combined. In such case, an emulsifier can be added to one, some or all intermediate products, as desired.

In one embodiment, the pre-processing forms a first intermediate beverage product. In one embodiment, the pre-processing forms an intermediate carbonated soda or soft drink beverage product. Pre-processing to form other types of beverages can also be useful.

The pre-processing, in one embodiment comprises a step of dissolving the emulsifier. The emulsifier, in one embodiment, comprises a PEC and a SEC. The PEC includes a conventional emulsifier such as modified starch or gum Arabic. Various types of modified starch and gum Arabic that are conventionally used as emulsifiers can be used. The SEC comprises pectin, for example HM pectin, and can be derived from various sources, such as apples, vegetables including beets or a combination thereof. The ratio of PEC to SEC, in one embodiment is about 100:1. Preferably, the ratio of PEC to SEC is about 50:1. The PEC can include APEC. The APEC, for example, comprises hydrocolloids such as carageenan, agar, xanthan gum, gellan gum, guar gum, gum ghatti, alginates, locust beans, gelatin, modified gums or the like or a combination thereof. Typically, about 0.05 wt % of APEC is added to the formulation. Other amounts may also be useful.

The emulsifier can be provided in dry form. Providing the emulsifier in other forms may also be useful. The emulsifier in dry form may be dissolved in a liquid before it is added to the first intermediate food product. In one embodiment, the emulsifier is dissolved in water. In another embodiment, the emulsifier is dissolved in water and propylene glycol blends, water and ethanol blends, an the like. Other ingredients may be added to the first intermediate food product together with the emulsifier. For example, ingredients such as acidulants, preservatives and other water soluble ingredients may be added. Examples of acidulants, preservatives and other water soluble ingredients used include citric acid, ascorbic acid, sodium benzoate, potassium benzoate, phosphoric acid, potassium sorbate and the like.

Shearing and/or heat may be applied to dissolve the emulsifier and the additional ingredients (if present) in the liquid. Process parameters such as shear rate, temperature and time can be determined optimally by one skilled in the art. For example, shear mixing or agitate for 15-30 min at 70-130° F. is optimal. The mixing should provide a substantially homogenous distribution of the components in the liquid.

Next, the oil component to be emulsified is added to the dissolved emulsifier solution. Shearing and/or heat may be applied to mix the oil and the dissolved emulsifier. In one embodiment, either a shear mixer, a conventional mixer, or a high shear mixer such as Scott turbine high shear mixer may be used to disperse the oil component in the emulsifier solution.

After mixing, a pre-emulsion with oil particle size ranging between about 1 and 50 microns is formed. The oil component, in accordance to one embodiment, can be flavor oil, flavor oil with weighting agent, oil soluble vitamins, or flavorless oil such as medium chain triglyceride or vegetable oil. Next, the pre-emulsion is homogenized using a high pressure homogenizer such as APV homogenizer or Gaulin homogenizer. In one embodiment, the pre-emulsion is homogenized between 1,000 to 5,000 psi. Preferably, the pre-emulsion is homogenized around 3,000 psi. After homogenization, flavor or cloud concentrate is formed as an intermediate product. The concentrate, in accordance to the invention, has a typical shelf life of about 1 year.

The process continues at step 120 by forming a second intermediate product. The second intermediate product comprises base syrup. In one embodiment, a concentrated solution of sugar or artificial sweetener together with additional ingredients such as acidulants and preservatives, coloring agents and juice components are used to form a base syrup. This can be achieved by simple agitation and dissolution. The flavor or cloud concentrate is added to the syrup to form a finished syrup. Although the formation of syrup and addition of flavor or cloud concentrate is described as separate processes, it is understood that these processes can be combined.

Alternatively, a base syrup need not be formed. A sugar or sweetener solution at the beverage strength with acidulants, salts or other functional ingredients such as juice component and vitamins may be prepared and added together with the flavor emulsion concentrate and/or cloud at the pre-processing step.

After forming the intermediate products, post-processing is performed at step 130. It is understood that the post-processing step includes any process steps carried out after the formation of a stable emulsion, to form the final product. Post-processing, in one embodiment, includes: combining the finished syrup with other liquid for example water in appropriate amounts to form a beverage, pasteurization, carbonation, filling of the product in containers, and packaging. In one embodiment, the finished syrup is further diluted with water at, for example, 1 to 4 or 1 to 5 ratios. The finished beverage is then hot filled or aseptically processed after filling. For carbonated soft drinks, carbonation is applied before filling.

EXPERIMENTS

The following examples showing various parameters and compositions of individual serving of beverages in accordance with various embodiments of the invention.

Example 1

The surface tension of modified starch, Gum Arabic, emulsifying pectin and combination of starch/pectin, GA/pectin were measured with drop volume tensiometer and Kruss tensiometer K100.

TABLE 1

| Samples | Surface Tension (mN/m) |
| --- | --- |
| 0.5% wt/wt pectin | 50.43 |
| 1% wt/wt Pectin | 48 |
| 1% modified starch | 60 |
| 5.5% modified starch | 38 |
| 10% modified starch | 38 |
| 5% Gum Arabic | 65 |
| 10% Gum Arabic | 63 |

The emulsion particle size of starch, pectin, and combination starch/pectin were measured with Horiba laser light scattering LA 930.

TABLE 2

| Orange Beverage | Particle Size mean (micron) |
| --- | --- |
| 11% starch | 0.186 |
| 1% pectin | 0.272 |
| 2% pectin | 0.239 |
| 11% starch | 0.201 |
| 7.7% starch and 0.1% pectin | 0.320 |
| 7.7% starch and 0.2% pectin | 0.327 |
| 5.5% starch and 0.1% pectin | 0.323 |
| 5.5% starch and 0.2% pectin | 0.321 |

The beverage appearance as indicated by turbidity of the beverage made with starch, combination of starch/pectin, gum Arabic, and combination of gum Arabic/pectin were measured with Hach 2100AN Turbidimeter.

TABLE 3

| Beverage Made With | Turbidity NTU |
|---|---|
| 11% Starch | 150 |
| 5.5% Starch and 0.1% pectin | 260 |
| 15% Gum Arabic | 240 |
| 10% Gum Arabic and 0.1% pectin | 220 |

Example 2

The following beverage was prepared with the following ingredients, 11 wt % modified starch and 0 wt % pectin. Water-soluble ingredients including sodium benzoate (0.1 wt %), citric acid (1.5 wt %), modified starch (11 wt %), yellow 6 (2 wt %) were dissolved in water (78.4 wt %) to from an intermediate beverage. The oil component (orange flavor, 7 wt %) was then added to the dissolved emulsifier solution, mixed and homogenized.

TABLE 4

| Components | wt % |
|---|---|
| Sodium benzoate | 0.1 |
| Citric acid | 1.5 |
| Orange flavor | 7 |
| Modified starch | 11 |
| Pectin | 0 |
| Yellow 6 | 2 |
| Water | 78.4 |

Example 3

The following beverage was prepared containing the following ingredients, 5.5 wt % modified starch and 0.2 wt % pectin. The preparative process was similar to that in Example 2. Sodium benzoate (0.1 wt %), citric acid (1.5 wt %), modified starch (5.5 wt %), pectin (0.2 wt %) were dissolved in water (85.31 wt %) to form an intermediate beverage. The oil component (brilliant blue, 0.39 wt %) was then added to the dissolved emulsifier solution, mixed and homogenized.

TABLE 5

| Components | wt % |
|---|---|
| Sodium benzoate | 0.1 |
| Citric acid | 1.5 |
| Berry flavor | 7 |
| Modified starch | 5.5 |
| Pectin | 0.2 |
| Brilliant blue | 0.39 |
| Water | 85.31 |

Example 4

The following beverage was prepared with the following ingredients and 7.5 wt % gum Arabic and 0.3 wt % pectin. The preparative process was similar to that in Example 2. Sodium benzoate (0.1 wt %), citric acid (1.5 wt %), gum Arabic (7.5 wt %), pectin (0.3 wt %) were dissolved in water (79.6 wt %) to form an intermediate beverage. The oil component (orange flavor, 11 wt %) was then added to the dissolved emulsifier solution, mixed and homogenized.

TABLE 6

| Components | wt % |
|---|---|
| Sodium benzoate | 0.1 |
| Citric acid | 1.5 |
| Orange flavor | 11 |
| Gum Arabic | 7.5 |
| Pectin | 0.3 |
| Water | 79.6 |

Example 5

The following beverage was prepared with the following ingredients and 15 wt % modified starch and 0 wt % pectin. The preparative process was similar to that in Example 2. Sodium benzoate (0.1 wt %), citric acid (1.5 wt %), modified starch (15 wt %) were dissolved in water (72.4 wt %) to form an intermediate beverage. The oil component (orange flavor, 11 wt %) was then added to the dissolved emulsifier solution, mixed and homogenized.

TABLE 7

| Components | wt % |
|---|---|
| Sodium benzoate | 0.1 |
| Citric acid | 1.5 |
| Orange flavor | 11 |
| Modified starch | 15 |
| Pectin | 0 |
| Water | 72.4 |

Example 6

In this study, the concentrate stability and the beverage stability were measured.

The concentrate stability was evaluated based on emulsion particle size. A good concentrate stability is defined having little or no change in emulsion droplet size over it's shelf life. A good concentrate stability is characterized by the observation that there is no visual phase separation (oily on top or precipitate on the bottom).

The beverage stability was evaluated based on its physical appearance. A good beverage stability is defined having an uniform in cloudiness and color, no visible emulsion droplets or other particulates on the beverage surface or anywhere through out the bottle. The task of preparing a good beverage stability is challenging and represents a crucial stage. It is because at this stage the concentration of emulsifiers is very low. Only when a consumer sees a good stable beverage will he/she consumes the beverage product.

The following table shows the stability evaluation of different beverages containing various emulsifier systems.

TABLE 8

| Formula Emulsifier and Oil Content | Concentrate Stability | Beverage Stability |
|---|---|---|
| 11% modified starch and 6.4% orange oil | Good | Good |
| 5.5% modified starch and 6.4% orange oil | Good | Defective beyond 30 days |
| 5.5% modified starch and 0.2% pectin, 6.4% orange oil | Good | Good |
| 1% pectin and 6.4% orange oil | Good | Defective beyond 10 days |

TABLE 8-continued

| Formula Emulsifier and Oil Content | Concentrate Stability | Beverage Stability |
|---|---|---|
| 2% pectin and 6.4% orange oil | Good | Defective beyond 10 days |

These data clearly show that a combined use of a primary emulsifier (e.g., modified starch, 5.5 wt %) and a secondary emulsifier (e.g., pectin, 0.2 wt %) is effective to produce a 2-folds increase in emulsifying capacity over the primary emulsifier alone (e.g., modified starch, 11 wt %). The use of conventional concentrations of pectin (i.e., 1-2 wt %) surprisingly was found to lead to poor beverage stability.

The invention may be embodied in other specific forms without departing form the spirit or essential characteristics thereof. The foregoing embodiments, therefore, are to be considered in all respects illustrative rather than limiting the invention described herein. Scope of the invention is thus indicated by the appended claims, rather than by the foregoing description, and all changes that come within the meaning and range of equivalency of the claims are intended to be embraced therein.

What is claimed is:

1. A beverage, comprising:
   a) a primary emulsifier selected from the group consisting of gum Arabic, modified starch, or a combination thereof; and
   b) a secondary emulsifier in the amount of about 0.1 wt % to about 0.6 wt %, said secondary emulsifier is an emulsifying pectin derived from a plant,
   wherein the primary and secondary emulsifiers are present in a ratio of about 100:1 to about 50:1 to provide a stable emulsion, and to produce at least a 2-folds increase in emulsifying capacity over the primary emulsifier alone.

2. The beverage of claim 1, wherein the emulsifying pectin is a beet pectin.

3. The beverage of claim 1, wherein the emulsifying pectin is an apple pectin.

4. The beverage of claim 1, wherein the emulsifying pectin is a high methoxyl pectin.

5. The beverage of claim 1, wherein the emulsifying pectin is in the amount of about 0.2 wt %.

6. The beverage of claim 1, wherein the emulsifying pectin is in the amount of about 0.3 wt %.

7. The beverage of claim 1, wherein the primary emulsifier is a modified starch.

8. The beverage of claim 7, wherein the modified starch is octenylsuccinate modified food starch.

9. The beverage of claim 1, further comprising a hydrocolloid.

10. The beverage of claim 9, wherein the hydrocolloid is selected from the group consisting of carageenan, agar, xanthan gum, gellan gum, guar gum, gum ghatti, locust bean, modified gums or a combination thereof.

11. The beverage of claim 9, wherein the hydrocolloid is in the amount of about 0.05 wt %.

12. A process of preparing a stable beverage, comprising the steps of:
   a) pre-processing to produce an intermediate product;
   b) adding a primary emulsifier selected from the group consisting of gum Arabic, modified starch, or a combination thereof; and
   c) adding a secondary emulsifier in the amount of about 0.1 wt % to about 0.6 wt %, said secondary emulsifier is an emulsifying pectin; and
   d) post-processing to produce a stable beverage
   wherein the primary and secondary emulsifiers are added in a ratio of about 100:1 to about 50:1 to provide a stable emulsion, and to produce at least a 2-folds increase in emulsifying capacity over the primary emulsifier alone.

* * * * *